United States Patent
Park et al.

(10) Patent No.: US 10,074,345 B2
(45) Date of Patent: Sep. 11, 2018

(54) MOBILE TERMINAL HAVING A MULTIFACETED GRAPHICAL OBJECT AND METHOD FOR PERFORMING A DISPLAY SWITCHING OPERATION

(71) Applicant: Pantech Co., Ltd., Seoul (KR)

(72) Inventors: Sang-Wook Park, Seoul (KR);
Hyoung-Il Park, Seoul (KR);
Seung-Jin Ahn, Seoul (KR)

(73) Assignee: Pantech Inc., Seoul (KR)

( * ) Notice: Subject to any disclaimer, the term of this patent is extended or adjusted under 35 U.S.C. 154(b) by 176 days.

(21) Appl. No.: 13/741,539

(22) Filed: Jan. 15, 2013

(65) Prior Publication Data

US 2013/0215153 A1    Aug. 22, 2013

(30) Foreign Application Priority Data

Feb. 20, 2012 (KR) .................. 10-2012-0017134
Jun. 25, 2012 (KR) .................. 10-2012-0067965

(51) Int. Cl.
*G09G 5/36* (2006.01)
*G06F 3/0488* (2013.01)
(Continued)

(52) U.S. Cl.
CPC ........... *G09G 5/363* (2013.01); *G06F 1/1626* (2013.01); *G06F 1/1694* (2013.01);
(Continued)

(58) Field of Classification Search
CPC ..... G09G 5/363; G06F 3/0488; G06F 3/0346; G06F 3/0482; G06F 1/1626; G06F 3/041;
(Continued)

(56) References Cited

U.S. PATENT DOCUMENTS 7,007,242 B2 *   2/2006   Suomela .............. G06F 3/0481
                                                    715/849
8,830,225 B1 *   9/2014   Karakotsios .......... G06T 3/60
                                                    345/419
(Continued)

FOREIGN PATENT DOCUMENTS

CN    101291492    10/2008
CN    101321204    12/2008
(Continued)

OTHER PUBLICATIONS

English Translation of IDS CN101291492A, Oct. 2008, p. 1-27.*
European Search Report dated Feb. 19, 2016, in European Application No. 13155054.3.

*Primary Examiner* — Yuehan Wang
(74) *Attorney, Agent, or Firm* — H.C. Park & Associates, PLC

(57) ABSTRACT

A mobile terminal includes a display unit to display a first surface of a multifaceted graphical object, a motion detecting unit to detect a motion of the mobile terminal, and a control unit to switch the displayed first surface to a second surface of the multifaceted graphical object based on the detected motion. A method for switching a display surface of a multifaceted graphical object includes displaying a first surface of the multifaceted graphical object on a mobile terminal, detecting a motion of the mobile terminal, and switching the displayed first surface to a second surface of the multifaceted graphical object based on the detected motion.

23 Claims, 11 Drawing Sheets

(51) Int. Cl.
*G06F 1/16* (2006.01)
*G06F 3/0482* (2013.01)
*G06F 3/0346* (2013.01)

(52) U.S. Cl.
CPC .......... *G06F 3/0346* (2013.01); *G06F 3/0482* (2013.01); *G06F 3/0488* (2013.01); *G06F 2200/1637* (2013.01)

(58) Field of Classification Search
CPC ............. G06F 3/04842; G06F 3/04817; G06F 3/0481; G06F 3/04845; G06F 3/03547; G06F 2203/04108; G06F 2203/04802
USPC ........................................................ 345/650
See application file for complete search history.

(56) References Cited

U.S. PATENT DOCUMENTS

| | | | |
|---|---|---|---|
| 2005/0197163 A1* | 9/2005 | Lee et al. | 455/564 |
| 2008/0266289 A1 | 10/2008 | Park | |
| 2009/0303204 A1* | 12/2009 | Nasiri et al. | 345/184 |
| 2010/0093400 A1* | 4/2010 | Ju | G06F 3/04817 455/566 |
| 2010/0315417 A1* | 12/2010 | Cho et al. | 345/419 |
| 2011/0090145 A1* | 4/2011 | Lu | 345/156 |
| 2011/0119629 A1 | 5/2011 | Huotari et al. | |
| 2011/0161884 A1 | 6/2011 | Dugan et al. | |
| 2011/0296339 A1 | 12/2011 | Kang | |
| 2012/0242659 A1* | 9/2012 | Sun | G06F 3/04886 345/419 |

FOREIGN PATENT DOCUMENTS

| | | |
|---|---|---|
| CN | 101957719 | 1/2011 |
| CN | 102262503 | 11/2011 |
| JP | 2002169640 | 6/2002 |
| JP | 2003-271295 | 9/2003 |
| JP | 2005-159470 | 6/2005 |
| JP | 2007-312360 | 11/2007 |
| JP | 2008-158723 | 7/2008 |
| JP | 2009510643 | 3/2009 |
| JP | 2011090640 | 5/2011 |
| KR | 10-0746008 | 8/2007 |
| KR | 10-2010-0025090 | 3/2010 |
| KR | 10-0983621 | 3/2010 |

* cited by examiner

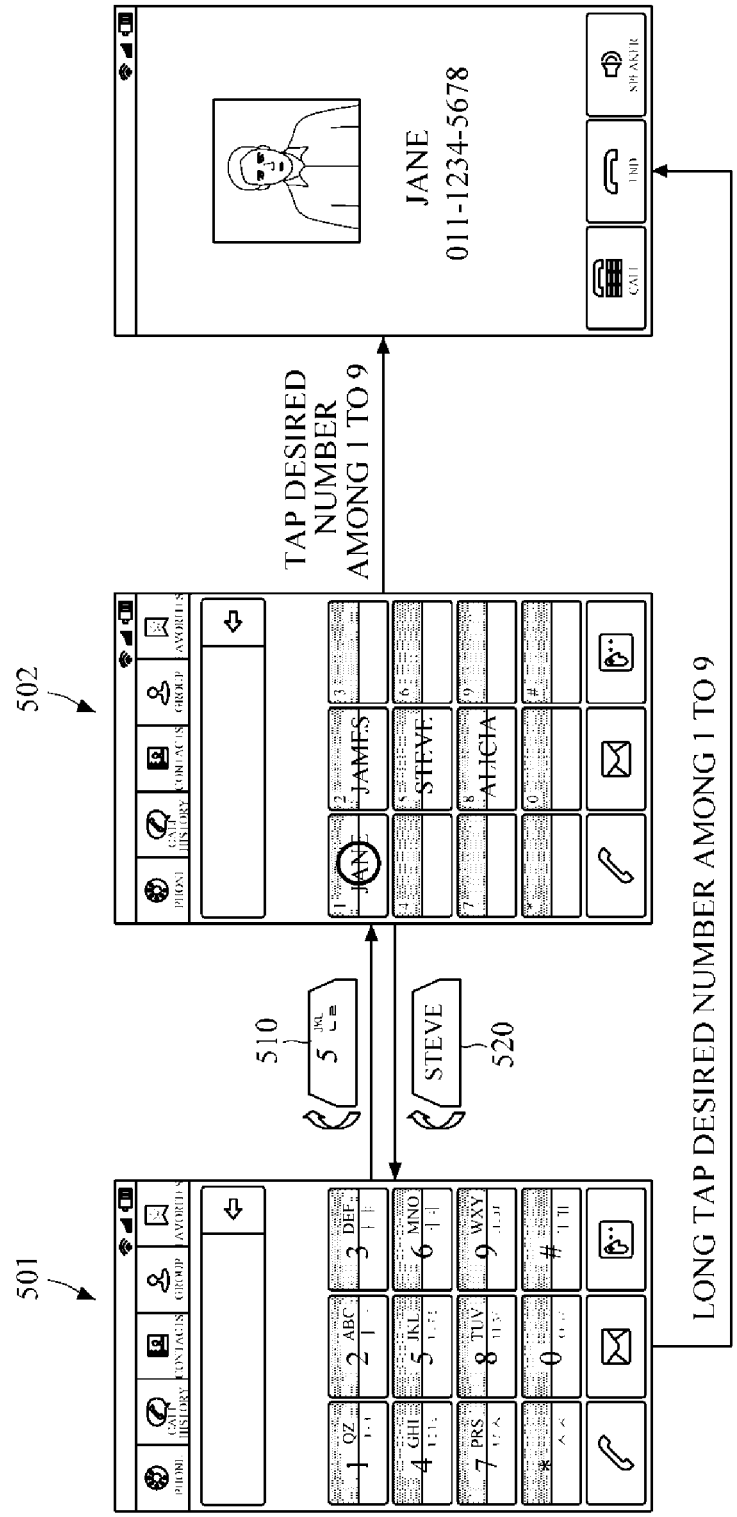

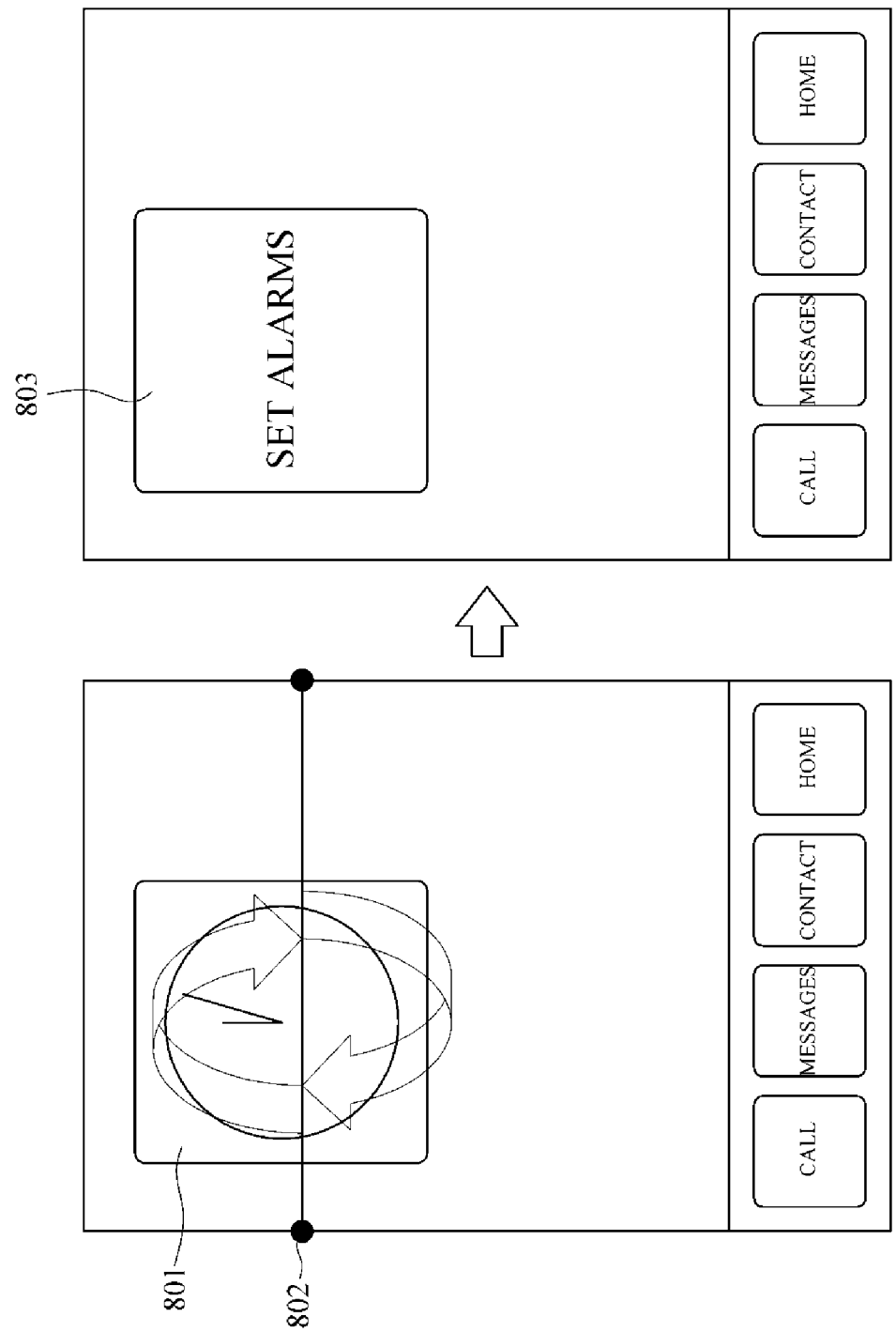

MOBILE TERMINAL HAVING A MULTIFACETED GRAPHICAL OBJECT AND METHOD FOR PERFORMING A DISPLAY SWITCHING OPERATION

CROSS-REFERENCE TO RELATED APPLICATION

This application claims priority from and the benefit under 35 U.S.C. § 119(a) of Korean Patent Application Nos. 10-2012-0017134, filed on Feb. 20, 2012, and 10-2012-0067965, filed on Jun. 25, 2012, which are hereby incorporated herein by reference for all purposes.

BACKGROUND

Field

The following description relates to a graphical user interface (GUI) of a mobile terminal having a multifaceted graphical object and a method for performing a display switching operation.

Discussion of the Background

A graphical user interface (GUI) provides a work environment that enables a user to efficiently exchange data with a computer using graphical information, such as menus, icons, buttons, and the like. A user interface of a related art may be operated using an input device, such as a keyboard or a mouse. Typically, a user makes a choice on a displayed menu on a screen using the keyboard or the mouse to direct an operation.

With further development of a touch screen, the GUI has been introduced to enable a user to directly manipulate the GUI displayed on a screen without the assistance of an additional input device. For example, in a smartphone, various graphic icons, as part of the GUI, may be displayed on a touch screen, and the user may interact with a system by touching the graphic icons displayed on the screen.

A number of operations may be mapped to a single graphic icon. For example, on a numerical keypad for making phone calls, a short press on a number 1 button may input number 1 as part of a phone number for dialing, but a long press on the same number button may activate a speed-dial operation to make a call to the phone number that has previously been designated under number 1.

However, if multiple operations are designated to numerical buttons displayed on the keypad, it may be difficult for the user to remember all of the operations mapped to their related graphic numerical icon button, and as a result, the user needs to manually activate the graphic icon button to identify each operation.

Further, there is a size restriction in an area of a GUI button, which may be used to display corresponding information. If more information is inserted on the GUI button to be displayed, it becomes difficult for the user to read or identify the information and aesthetic quality may be degraded.

Moreover, to change mode of the GUI, for example, from an alpha character keyboard to a numerical keyboard, the user needs to press a mode switch button, or to access a menu to change the mode.

SUMMARY

Exemplary embodiments of the present invention provide a graphical user interface (GUI) of a mobile terminal with multifaceted graphical objects.

Additional features of the invention will be set forth in the description which follows, and in part will be apparent from the description, or may be learned by practice of the invention.

Exemplary embodiments of the present invention provide a method for switching a display surface of a multifaceted graphical object including displaying a first surface of the multifaceted graphical object on a mobile terminal; detecting a motion of the mobile terminal; and switching the displayed first surface to a second surface of the multifaceted graphical object based on the detected motion.

Exemplary embodiments of the present invention provide a mobile terminal including a display unit to display a first surface of a multifaceted graphical object; a motion detecting unit to detect a motion of the mobile terminal; and a control unit to switch the displayed first surface to a second surface of the multifaceted graphical object based on the detected motion.

Exemplary embodiments of the present invention provide a mobile terminal including a display unit to display a first surface of a multifaceted graphical object; a motion detecting unit to detect a motion of the mobile terminal; and a control unit to switch the displayed first surface to a second surface of the multifaceted graphical object based on the detected motion, in which each surface corresponds to a different operation of the mobile terminal.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 5A and FIG. 5B illustrate performing an operation of a mobile terminal using a display switching operation of a 3D keypad according to exemplary embodiments of the present invention.

FIG. 8A, FIG. 8B, and FIG. 8C illustrate performing an operation of a mobile terminal using a display switching operation of a 3D keypad according to exemplary embodiments of the present invention.

DETAILED DESCRIPTION OF THE ILLUSTRATED EMBODIMENTS

Figure 1:
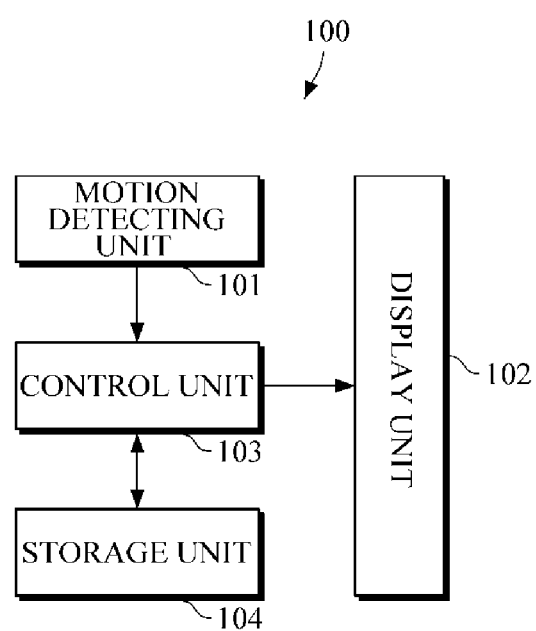
FIG. 1 is a schematic diagram illustrating a configuration of a mobile terminal to provide a graphical user interface (GUI) with a three dimensional (3D) key according to an exemplary embodiment of the present invention.

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity, illustration, and convenience.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

FIG. 1 is a schematic diagram illustrating a configuration of a mobile terminal to provide a graphical user interface (GUI) with a three dimensional (3D) key according to an exemplary embodiment of the present invention.

Referring to FIG. 1, mobile terminal 100 may be, without limitation, a mobile phone, a smartphone, a tablet personal computer (PC), a portable multimedia player, an MP3 player, and the like. The mobile terminal 100 includes a motion detecting unit 101, a display unit 102, and a control unit 103. In addition, the mobile terminal 100 may further include a storage unit 104.

The motion detecting unit 101 may detect a motion of the mobile terminal 100. For example, the motion detecting unit 101 may detect, without limitation, at least one of a tilting motion, a lateral movement, a vertical movement, a rotating motion, and a flipping motion. The tilting motion may refer to orienting one end of the mobile terminal 100 to be leaning at a reference angle from an initial position. In an example, initial position may refer to an initial holding position, in which an elongated side of the mobile terminal 100 is oriented to extend vertically. Accordingly, the user may perform the tilting motion to orient the upper end of the mobile terminal 100 away from the user while orienting the lower end of the mobile terminal 100 towards the user, such that the user may more easily view a screen of the mobile terminal 100.

Further, the tilting motion may be detected when the user tilts the mobile terminal 100 in a particular direction and/or at a particular angle with respect to a reference axis. For example, the reference axis may refer to an axis of rotation where a first end, such as an upper end, of the mobile terminal 100 tilts away from the user and a second end, such as a lower end, of the mobile terminal 100 tilts towards the user. The flipping or rotating motion may be detected when a user provides one or more flick motion with the mobile terminal 100. More specifically, the flipping motion may refer to moving or rotating the mobile terminal 100 in a particular direction and reverting back towards an original position or orientation in quick succession. The flipping or rotating motion may be detected when the mobile terminal 100 is moved or flicked in a particular direction. More specifically, the flipping motion may be detected when the mobile terminal 100 is moved or flicked in succession in opposing directions. For example, the flipping motion may refer to moving or flicking the mobile terminal 100, without limitation, back and forth, side to side, or up and down. In addition to the tilting motion and the flipping motion, the motion detecting unit 101 may detect other various motions of the mobile terminal 100. For example, the motion detecting unit 101 may detect a shaking motion of the mobile terminal 100 or an applied pressure above a reference threshold on the mobile terminal 100.

The motion detecting unit 101 may include various sensors to detect information of the mobile terminal 100, such as orientation, acceleration, location, temperature, pressure, luminance, magnetic field, and the like. The motion detecting unit 101 may also include an analysis module to analyze information outputted from the sensors. Examples of the sensors may include, without limitation, at least one of an acceleration sensor, a gyro sensor, a camera, a temperature sensor, a pressure sensor, a luminance sensor, a proximity sensor, an ultrasonic sensor, a magnetic field sensor, and the like.

The display unit 102 may display one or more multifaceted graphic objects, which may include, without limitation, multifaceted keys, multifaceted icons, and the like. Multifaceted graphic objects, such as the multifaceted keys may include, without limitation, 3D keys. Exemplary embodiments may be described with respect to 3D keys for simplicity, however, aspects of the invention are not limited thereto, such that other multifaceted keys or multifaceted graphic objects may be used. Multifaceted keys, multifaceted icons, or other multifaceted graphical objects may have multiple surfaces, which may be manipulated to display different surfaces.

In an example, the display unit 102 may be one of a liquid crystal display (LCD), a flexible display, or the like. The 3D keys may control various operations of the mobile terminal 100. In an example, the 3D keys may be implemented as 3D dialing keys used to dial numbers (e.g., phone number) or a 3D texting keys to compose text messages. In addition, the 3D keys may graphically be represented in 3D form having at least two surfaces. For example, a first surface of the 3D key may be mapped to a numerical keypad button, such as number 1, to perform a dialing operation and a second surface of the 3D key may be mapped to specific speed-dial information, which may be used to perform a speed-dial operation to dial a phone number with a press of a single key or without inputting all of the digits of a phone number. The speed-dial information of the second surface may correspond to the first surface of the 3D numerical keypad button. Although the keys described herein are referred to as being 3D, aspects of the invention are not limited thereto, such that the keys may be two dimensional (2D). More specifically, the 2D key may have multiple operations or surface images tied to the 2D key, such that images corresponding to different operations may be switched according to detected movement of the mobile terminal 100. However, aspects of the invention are not limited thereto, such that other multifaceted graphic objects may be used. For example, a graphic object may include, without limitation, at least one of an icon, application, screen, and the like.

The speed-dial information may include identification information (e.g., name, icon, avatar, and the like) of a recipient corresponding to the numerical keypad button. As another example, one or more of the 3D keys may have a first surface mapped with a main button group and a second surface mapped with a sub-button group. The main button group may include the native language characters, and the sub-button group may include second-language characters, special characters, numbers, and the like. For convenience of explanation, the 3D keys will be described as having two surfaces. However, aspects of the invention are not limited thereto, such that the 3D key may be multifaceted having three or more surfaces.

Further, one or more surfaces of the 3D key may display identification information of a corresponding speed-dial number. For example, a first surface of the 3D key may display a numerical keypad button of a speed-dial number, a second surface may display a name associated with the speed-dial number, a third surface may display a phone number saved under the speed-dial number, and a fourth surface may displays a photo or an image related to the speed-dial number. If there are more speed-dial numbers than the available numerical keypad buttons (e.g., 0 to 9), the speed-dial numbers may be mapped to and displayed on additional surfaces of one or more 3D key. For example, if the 3D keys display 10 keypad numbers, ranging from 0 to 9, and there are 30 speed-dial numbers, a first surface of each 3D key may be configured to display a keypad number, a second surface may be configured to display identification information corresponding to first 10 speed-dial numbers (e.g., 1-10), a third surface may be configured to display identification information corresponding to second 10 speed-dial numbers (e.g., 11-20), and a fourth surface may be configured to display identification information corresponding to third 10 speed-dial numbers (e.g., 21-30). Accordingly, a user may consecutively change the display of speed-dial numbers from the first 10 speed-dial numbers (e.g., 1-10), the second 10 speed-dial numbers (e.g., 11-20), and the third 10 speed-dial numbers (e.g., 21-30) by rotating a key on the 3D key display to display a first surface, a second surface, a third surface, and a fourth surface. Further, rotating a key on the 3D key display may switch a display surface of the entire 3D key display or an individual key on the 3D key display.

Further, surfaces of a 3D key may display different mapping groups. For example, a first surface of the 3D key may display a native language character(s), a second surface may display a second-language character(s), and a third surface may display a special character(s) or a number(s).

The display unit 102 may be a touch screen. By manipulating the 3D keys displayed on the display unit 102, the user can utilize various operations of the mobile terminal 100.

The display unit 102 may display the 3D key in multiple dimensions, such as in 3D. Further, the display unit 102 may use a graphic effect to display different surfaces of the 3D key with respect to time, such that the 3D keys appear to rotate. However, aspects of the invention are not limited thereto, such that various graphic effects may be applied to display transition between surfaces of the 3D key. For example, graphic effects may be applied to display a sliding transition, fading transition, transition using mosaics, and the like.

The control unit 103 may control a display switching operation of the 3D key displayed on the display unit 102 according to the motion detected by the motion detecting unit 101. In an example, the control unit 103 may include a processor to perform various calculations and analysis, such as a central processing unit (CPU). For example, when the first surface is displayed, the control unit 103 may control the graphic effect in the display unit 102 such that at least a part of the first surface and a part of the second surface appear at the same time as the 3D key rotates according to detected movement of the mobile terminal 100. Further, the 3D key may be rotated to be switched from the first surface that is displayed to display the second surface. Here, the rotation of the 3D key may refer to a front surface of the 3D key rotating to move towards the back and a back surface rotating to move towards the front with respect to a virtual axis. Further, the rotation of the 3D key may indicate that a part of the 3D key is folded with respect to a virtual axis and a back side of the folded part comes to be displayed. However, aspects of the invention are not limited thereto, such that rotation of the 3D key or the transition between multiple surfaces of the 3D key may be displayed in various methods, such as through fading, use of mosaics, and the like.

In one example, when a tilting motion is detected by the motion detecting unit 101, such that the mobile terminal 100 changes from a first position to a second position, the control unit 103 may rotate the 3D key according to at least one of a tilting direction and a titling angle to switch the currently displayed first surface to the second surface. The control unit 103 may control a rotation angle of the 3D key to be similar or substantially the same as the detected tilting angle, which may enable the display switching operation between the first surface and the second surface to be intuitively performed and recognized. For example, in response to the mobile terminal 100 being tilted backward at a reference angle, the control unit 103 may rotate the 3D key at a similar or the same angle as the tilting angle of the mobile terminal 100 to simultaneously display at least a part of the first surface and a part of the second surface. If the user tilts the mobile terminal backward to switch from the second position to the first position, the part of the first surface that was displayed may roll backwards to disappear or be hidden, and the second surface may roll forwards to be displayed. Similarly to the above, if the user tilts the mobile terminal forward from the first position to the second position, the first surface that was hidden or rolled back behind the second surface may be rolled forward to be displayed again. Further, if the user tilts the mobile terminal to a greater degree or holds the tilt for a reference time, the first surface may roll to completely be hidden and the second surface may be fully displayed.

Furthermore, the control unit 103 may control the 3D keys to appear as if they are rotated according to a tilting angle with respect to a current orientation without regard to a reference orientation of the mobile terminal 100, such as orientation of the mobile terminal 100 when a user first holds the mobile terminal 100. Also, the control unit 103 may control the 3D keys to rotate according to a movement in a first direction without regard to movement in a second direction. In addition, the 3D keys may be rotated in association with the tilting direction and tilting angle of the mobile terminal 100. More specifically, the 3D keys may be displayed as if they are rotated forward and backward according to a tilting angle of the mobile terminal 100, such as when the mobile terminal 100 is tilted forward and backward. Further, even when the mobile terminal is tilted leftward and rightward, the 3D keys may be displayed as if they are rotated forward and backward according to the tilting angle of the mobile terminal regardless of a movement in the other direction. However, aspects of the invention are not limited thereto such that, movements in multiple directions may be considered in the display switching operation.

According to aspects of the invention, it may be possible to maintain a display of the first surface if the tilted motile terminal is maintained within a reference threshold angle range. Once the mobile terminal is tilted beyond the threshold angle or a reference threshold angle range, the first surface may be switched to the second surface. Here, after the displayed surface is switched to the second surface, the display of the second surface may be maintained even when the mobile terminal returns to an original position or horizontal orientation. However, aspects of the invention are not limited thereto, such that the first surface is displayed when the mobile terminal returns to the original position or horizontal orientation. Further, it may be possible for the displayed surface to be switched back from the second surface to the first surface when the mobile terminal is tilted more than the reference threshold angle.

As another example, when a flipping or rotating motion is detected by the motion detecting unit 101, the control unit 103 may flip or rotate the 3D keys to switch from the first surface to the second surface, or vice versa. For example, if a first flipping or rotating motion is detected the control unit 103 may flip or rotate the 3D key to switch from the first surface to the second surface. If a second flipping motion is detected, the control unit 103 may flip or rotate the 3D key to switch from the second surface to the first surface. The flipping or rotating direction may correspond to the flipping or rotating motion of the mobile terminal 100. Further, the flipping or rotating motion may be detected, without limitation, when the mobile terminal rotates around an axis of rotation or moves in a direction at a speed above a reference threshold.

Further, the switch between the first surface and the second surface may be determined based on the flipping direction. More specifically, the flipping motion in a first direction may initiate the switch from the first surface to the second surface, and flipping motion in a second direction (e.g., opposite or different direction to the one direction) may initiate the switch from the second surface to the first surface. In addition, if the 3D key comprises three or more surfaces, a displayed surface may be sequentially switched from one surface to another surface based on the number of flipping motions. For example, if a first flipping or rotating motion of the mobile terminal 100 is detected when the first surface is displayed, the displayed surface may be switched to the second surface, and if a second flipping or rotating motion of the motion terminal 100 is detected, the displayed second surface is switched to a third surface. In the same manner as the above, the switching direction of the surfaces may be based on the flipping direction of the mobile terminal.

According to aspects of the invention, a determination of whether to switch a display between the first surface and the second surface or perform a display switching operation may be based on at least one of a speed of a flicking or flipping motion of the mobile terminal 100, the direction of the flicking or flipping motion, and the intensity or acceleration of the flicking or flipping motion. More specifically, the display switching operation may not be executed when the speed or intensity of a detected flipping or flicking motion is smaller than the reference threshold value. If a flipping or flicking motion is performed at a speed or intensity higher than the reference threshold value, the display switching operation may be performed. Further, the method for performing the display switching operation may vary according to the speed or intensity of the flipping or flicking motion. For example, a flipping or flicking motion detected at a lower speed or a lower intensity may provide the display switching operation to be performed to switch from, for example, the first surface to the second surface, from the second surface to the third surface, and so on, based on a number of flipping or flicking motions. A flipping of flicking motion at a higher speed or a higher intensity may initiate the display switching operation to switch from the first surface directly to, for example, the third surface without displaying the second surface.

Although examples of changing a display of the multifaceted key is described with respect to one of a rotating motion, flipping motion, or a flicking motion, aspects of the invention are not limited thereto, such that the multifaceted key may be changed according to other detected motions or gestures. Other motions or gestures may include, without limitation, a dragging motion, scrolling motion, a tapping motion, a touch gesture, and the like.

The storage unit 104 may store information to be displayed on one or more surfaces of the 3D key or identification information of one or more surfaces of the 3D key. In an example, the storage unit 104 may include a non-transitory memory, which may be used to store various information or data. For example, numerical values (e.g., 0, 1, 2, . . . , 9) may be stored as information to be displayed on the first surface, names associated with speed-dial number information may be stored as information to be displayed on the second surface, and phone numbers corresponding to names associated with speed-dial numbers may be stored as information to be displayed on the third surface. The information to be displayed on the second surface, such as the identification information of a name field of a table storing the speed-dial numbers, may be mapped to the second surface and stored in the storage unit 104. In addition, the information to be displayed on the third surface, such as the identification information of phone number field of the table, may be mapped to the third surface and stored in the storage unit 104. As such, the storage unit 104 may map the information to the corresponding surface of one or more 3D keys and store the mapped information.

In addition, the storage unit 104 may store the switching direction and order of one or more 3D keys. More specifically, the order of switching the surfaces of the 3D key, the display switching operation method, and a designated graphic effect in accordance with the detected tilting motion or the flipping motion of the mobile terminal 100 may be stored in the storage unit 104. The order of switching may indicate an order in which the surfaces of the 3D key will be switched (e.g., a first surface->a second surface->a third surface, etc.), which may be based on the detected motion of the mobile terminal 100. The display switching operation method may indicate how to display the surfaces during the display switching operation of the 3D key according to the detected motion of the mobile terminal 100. For example, surfaces of the 3D key may be switched based on at least one of a tilting angle and a tilting direction. Further, surfaces of the 3D key may be immediately switched if a tilting motion is determined to be greater than a reference threshold angle or reference speed, or if a flipping motion is detected.

In response detecting a motion of the mobile terminal 100, the control unit 103 may recognize a displayed surface of the 3D key of the mobile terminal 100. Further, according to the detected motion of the mobile terminal 100, the control unit 103 may load an order of switching, which may be stored in the storage unit 104, and may determine which surface of the 3D key is to be displayed based on the loaded order of switching.

In addition, the control unit 103 may extract the switching method from the storage unit 104. The control unit 103 may further extract information corresponding to the surface of the 3D key to be displayed based on the extracted switching method, and changes the surface to be displayed.

In the example shown in FIG. 1, each unit may correspond to a logical classification based on its operation. However, aspects of the invention are not limited thereto, such that operations of the mobile terminal 100 may be classified based on different criteria from the criteria used in apparatus of FIG. 1. In addition, one or more units included in FIG. 1 may be individually implemented or in a combination of one or more units. Further, one or more operations of one unit may be performed by one or more different units. Moreover, each of the units may include any of various processors, computers, or application specific integrated circuits (ASICs), for example, specifically programmed to implement various operations of each of or more than one of the operations of such units.

Figure 2:
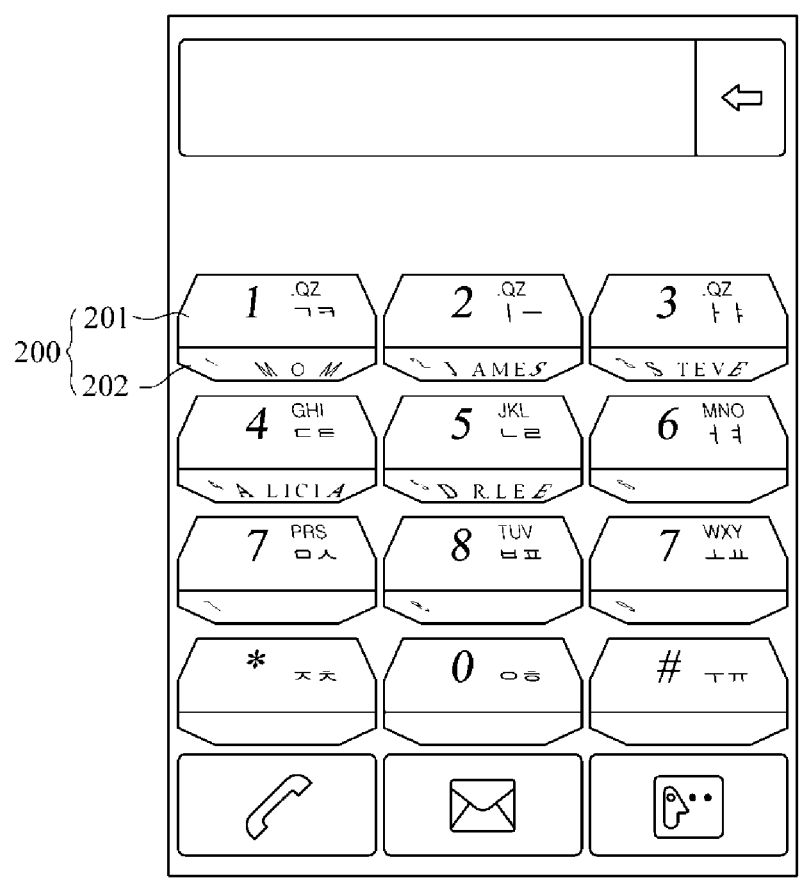
FIG. 2 illustrates a numerical 3D keypad according to an exemplary embodiment of the present invention.

FIG. 2 illustrates a numerical 3D keypad according to an exemplary embodiment of the present invention.

Referring to FIG. 2, each of the 3D keys includes a first surface 201 and a second surface 202. The 3D keys may be graphic images corresponding to various input buttons related to various operations (e.g., a phone call operation, a text message transmission, an execution of an application) of a mobile terminal. More specifically, a user may enable to use and control various operations of the mobile terminal by manipulating the 3D keys by touch.

In FIG. 2, the first surface 201 of the 3D key corresponds to a keypad number. For example, the first surface 201 may display a number, which may be inputted for dialing phone number or for performing other operations, such as operating a calculator application. The second surface 202 of the 3D key corresponds to speed-dial number information. More specifically, the second surface 202 may display a name of a contact. For example, the 3D key corresponding to a number 1, the first surface 201 displays the number 1 and the second surface 202 displays characters "Mom" that is mapped to a speed-dial number 1. Accordingly, when the user presses number 1 on the first surface 201, a phone call to "Mom" may be made.

Referring to FIG. 2, the 3D key 200 may display the first surface 201 and/or the second surface 202 based on the detected motion of the mobile terminal. A graphic effect that may be applied for the display switching operation between the first surface 201 and the second surface 202 may be based on the detected motion of the mobile terminal. For example, in response to the detected tilt the mobile terminal at an angle with respect to a current position or orientation, the 3D keys may be rotated at a corresponding angle. Thus, based on the tilt angle of the mobile terminal, a part of the first surface 201 and a part of the second surface 202 may be displayed simultaneously. Further, if the mobile terminal is tilted more than a reference angle, the 3D keys may rotate to switch the displayed surface from the first surface 201 to the second surface 202. In addition, when the user shakes the mobile terminal quickly, the 3D keys may be flipped or rotated, which may be done instantly, over and its displayed surface may be switched from the first surface 201 to the second surface 202.

For example, to make a phone call to one of the speed-dial contacts, such as "Mom", whose phone number is saved under a key button corresponding to number 1, the user may make a long press on number 1 key on the first surface 201. In addition, the user may tilt the mobile terminal to switch the display of the first surface 201 to the second surface 202 and then make a short touch on a key button corresponding to identification information labeled "Mom" on the second surface 202. In addition, the user may tilt the mobile terminal at a reference angle to identify the information displayed on the second surface 202, and return to an original position or orientation before the tilt, such as a position or orientation where the first surface 201 is displayed, and make a long press on the number 1 key on the first surface 201.

According to aspects of the invention, when the user presses or touches a key for a short duration or provides a short press or a short touch on a number key displayed on the first surface 201, the corresponding number may be inputted. Additionally, when the user presses or touches a key for a long duration or provides a long press or a long touch on the number key displayed on the first surface 201, the corresponding number may be extracted. A phone number mapped to the extracted number may be found in a speed-dial number table in the storage unit 104. Further, the mobile terminal may be connected using the extracted phone number. When the user makes a long touch on a number key displayed on the first surface 201 and a number corresponding to the number key does not have any phone number mapped thereto (i.e., the speed-dial number table does not include any phone number mapped to the number corresponding to the number key), a display may be switched to an edit screen that may enable storing of a speed-dial number. The edit screen may be used to store a desired phone number on the number key for speed-dialing. The edit screen may provide a display screen that is associated with a phonebook, which may enable the user to select a target phone number from the phonebook. Further, the edit screen may provide a screen that may enable the user to manually input or edit a phone number or a name of contact. In addition, the long touch on a number key corresponding to a speed-dial number on the displayed first surface 201 may provide an option menu to enable the user to make a phone call with the mapped phone number, or to edit the phone number saved as the speed-dial number. Here, the option menu may be displayed, without limitation, as a pop-up window, a pop-under window, highlighted key pad or the like.

Furthermore, a user's short touch or long touch on a number key on the second surface 202 may extract a value, such as name of a speed-dial contact or its corresponding phone number (e.g., contact "Jane" or a corresponding phone number of, e.g., "011-1234-5678"), corresponding to the touched key. Further, the properties of the extracted value, such as the name of the speed-dial contact or the corresponding phone number, may be determined, and the mobile terminal may dial the phone number mapped to the number key receiving the user touch, which may be a speed-dial number included in the speed-dial number table in the storage unit 104.

If the information displayed on the second surface 202 is a phone number, the call connection may be directly made without extracting information from the speed-dial number table. Here, when the user makes a short or long touch to select a number key and the selected number key does not have any phone number mapped thereto associated with the speed-dial operation, the display may be switched to an edit screen that may enable storing of a speed-dial number, which the user can use to map a desired phone number to the selected number key. The edit screen to store a speed-dial may be a display screen that enables the user to select a phone number from a phonebook or to manually input or edit contact information, such as a phone number or a name of contact, as described above.

Moreover, when the selected number key has a phone number mapped thereto, a long touch on the number key on the displayed second surface 202 may conduct a phone call with the mapped phone number and a short touch on the number key may enable the display screen to switch to the edit screen, which may allow editing of the phone number. Furthermore, a short touch or a long touch on the second surface 202 of the number key having the phone number mapped thereto may provide an option menu to enable the user to make a phone call with the mapped phone number or to edit the mapped phone number. The option menu may be displayed as a pop-up window or other compatible mechanism.

According to aspects of the invention, a long touch on the first surface 201 shown on the display may initiate extraction of a value corresponding to the second surface 202 and the extracted value may be displayed.

Although exemplary embodiments are described with respect to using a short touch or a long touch, aspects of the invention are not limited thereto such that other input types may be used. Further, use of short touch or a long touch may be interchanged.

Figure 3:
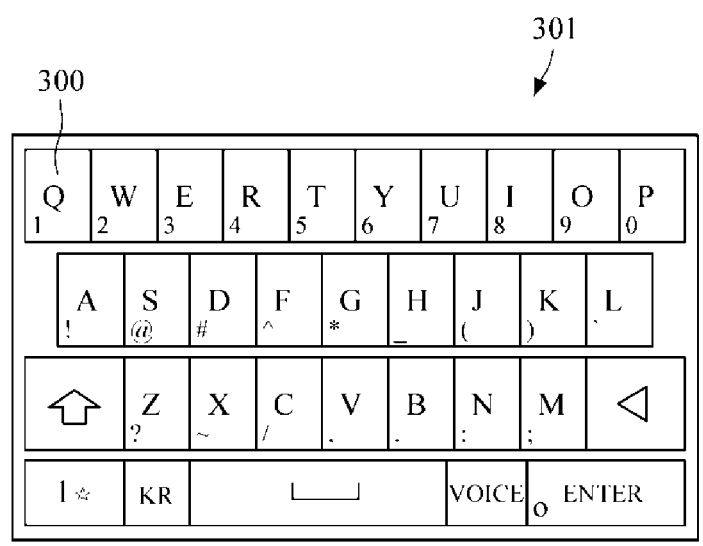
FIG. 3 illustrates a display switching operation of a 3D keypad according to an exemplary embodiment of the present invention.
Figure 3:
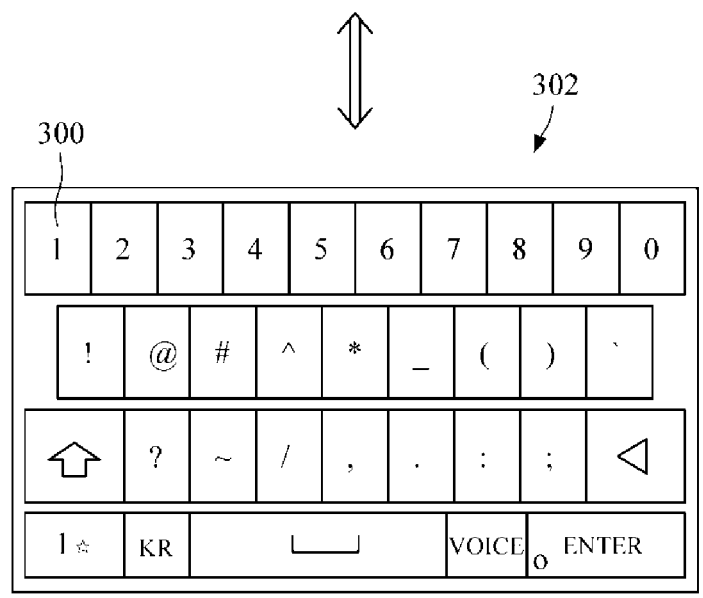

FIG. 3 illustrates a display switching operation of a 3D keypad according to an exemplary embodiment of the present invention.

Referring to FIG. 3, one or more of the 3D keys includes a first surface 31 and a second surface 302.

The first surface 301 may correspond to a main button group. For example, the first surface 301 may display English letters for entering text. The second surface 302 may correspond to a sub-button group. More specifically, the second surface 302 may display a number or a special character. For example, 3D key 300 corresponding to a number 1 on the second surface 302 may display a letter "q" on the first surface 301 and may display number "1".

Switch between the first surface 301 and the second surface 302 may be performed according to the detected motion of the mobile terminal. For example, the first surface 301 may be switched to the second surface 302 (or vice versa) when the user shakes the mobile terminal. When the user wants to input a special character, such as a question mark, while inputting an English letter by touching the first surface 301, the user may move, tilt, or shake the mobile terminal to switch the display of the first surface 301 to the second surface 302. Then, the user can input the special character shown on the second surface 302 and shake the mobile terminal again to revert back to the first surface 301.

When the user tilts the mobile terminal more than a reference angle in a particular direction, a currently displayed surface may be switched from the first surface 301 to the second surface 302, or vice versa.

Further, although not illustrated, the entire key board may be provided in 3D, such that the entire keyboard as a whole may be switchable to display a first surface, which may display English letters, and to a second surface, which may display a combination of numbers or letters, based on a tilt, motion, or orientation of the mobile terminal. In addition, a combination of select key buttons may be switched from a first surface to a second surface as a group, while other keys maintain a display of the first surface, based on a tilt, motion, or orientation of the mobile terminal.

Figure 4:
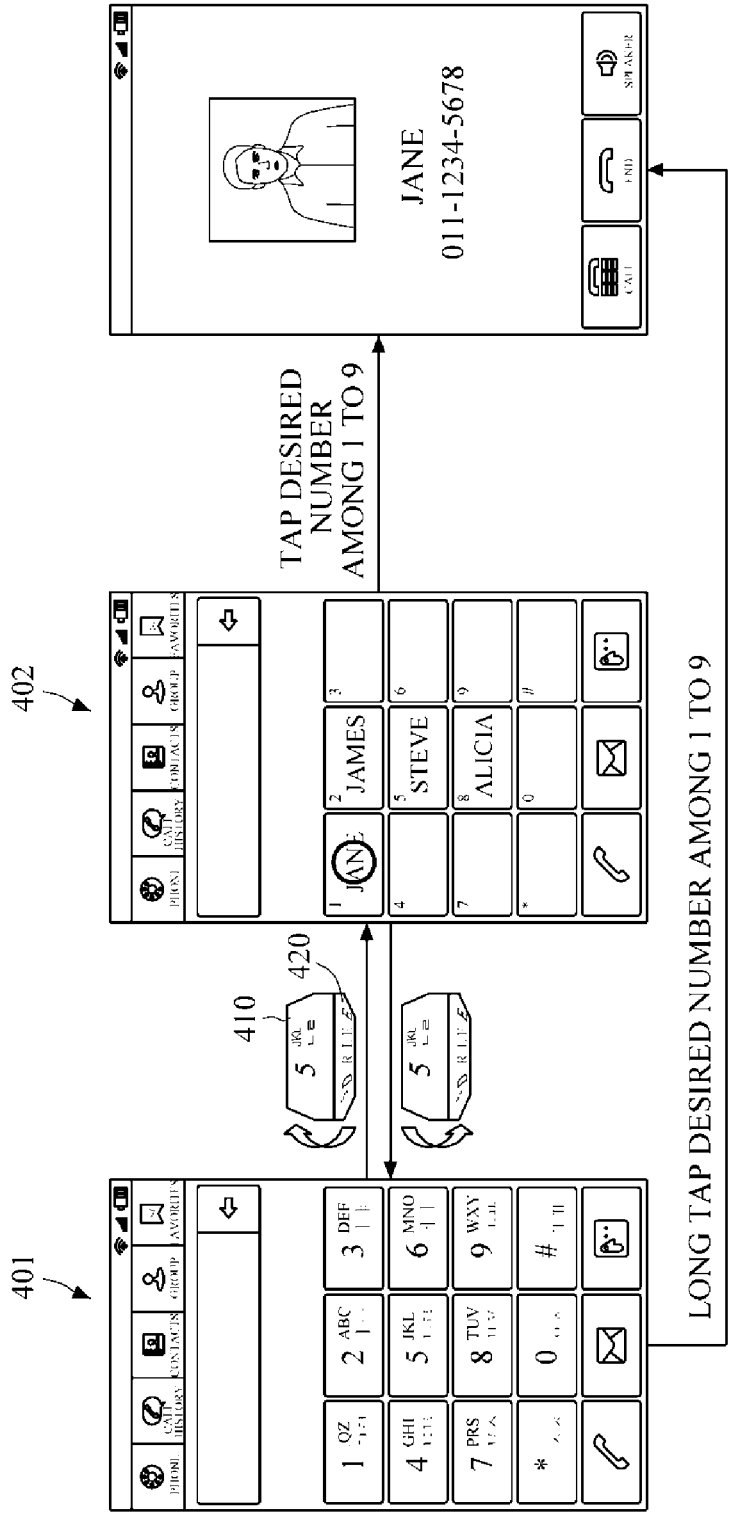
FIG. 4 illustrates a display switching operation of a 3D keypad and an operation of using a switched keypad according to an exemplary embodiment of the present invention.

FIG. 4 illustrates a display switching operation of a 3D keypad and an operation of using a switched keypad according to an exemplary embodiment of the present invention.

Referring to FIG. 4, in a first display screen 401, a long press on a keypad number may enable a call to a person saved under the corresponding number. If a phone number corresponding to a speed-dial contact of "Jane" is mapped to a number 1 key on a numerical keypad of the mobile terminal, the user can be connected to Jane by providing a long press on the number 1 key.

However, if the user does not know the identification information corresponding to the number 1 key or to which number the phone number of Jane is mapped, the user may tilt the mobile terminal in various directions, such as upward or downward, to make a second display screen 402 displayed.

When the second display screen 402 appears in response to the detected tilt of the mobile terminal, the user may see that the number 1 key is mapped with a contact named "Jane". The user may connect to "Jane" by tapping on a key labeled "Jane" on the second display screen 402. At the end of the call, the user may tilt the mobile terminal to display the first display screen 401 again. However, aspects of the invention are not limited thereto, such that the mobile terminal may automatically display the first display screen 401 or display an initial screen (e.g., a home screen) without additional action by the user.

In one example, when the user gradually tilts the mobile terminal towards a reference angle or within a reference range of angles, a portion of the first surface 410 may be rotated such that the portion of the first surface 410 and a portion of the second surface 420 of a 3D key can be displayed at the same time. Further, the keypad number buttons displayed in the first display screen 401 may gradually be rotated or flipped according to an increase in the tilting angle of the mobile terminal. When the user tilts the mobile terminal even more such that the mobile terminal is tilted beyond the reference angle, the first surface 410 of a 3D key may be completely rolled back and the first display screen 410 may be switched to the second display screen 402 to display the second surface 420. Thus, when the user is wondering who is saved under the number 1 key, the user can view the corresponding name of the contact "Jane", by tilting the mobile terminal.

In another example, a degree of the tilt of one or more 3D keys may be determined based on the tilt angle of the mobile terminal. For example, it may be possible to rotate the 3D keys at the same angle as the tilting angle of the mobile terminal. However, aspects of the invention are not limited thereto, such that the 3D keys may be rotated at a factor, such as half or double, of the angle of the tilting angle of the mobile terminal.

FIG. 5A illustrates performing an operation of a mobile terminal using a display switching operation of a 3D keypad according to an exemplary embodiments of the present invention.

Referring to FIG. 5A, like in FIG. 4, a first display screen 501 may display first surfaces 510 of one or more 3D keys, and a second display screen 502 may display second surface 520 of one or more 3D keys. The first surface 510 may display a keypad number used to perform a dialing operation, and a second surface 520 may display identification information of a contact assigned to the corresponding number.

Switching from the first display screen 501 to the second display screen 502 may be controlled by a tilting, flipping, or rotating motion of the mobile terminal. For example, if the user flicks the mobile terminal, the first display screen 501 may be switched to the second display screen 502.

Further, a graphic effect that may appear during the screen switch may be implemented in various ways. For example, as shown in FIG. 4, the screen may be switched while the 3D keys are rotating, or as shown in FIG. 5A, the screen may be switched while the 3D keys are folded over. However, aspects of the invention are not limited thereto, such that the first surfaces of one or more 3D keys may fade out to be replaced by the second surfaces or the first surfaces may be immediately switched to the second surfaces.

Figure 5B:
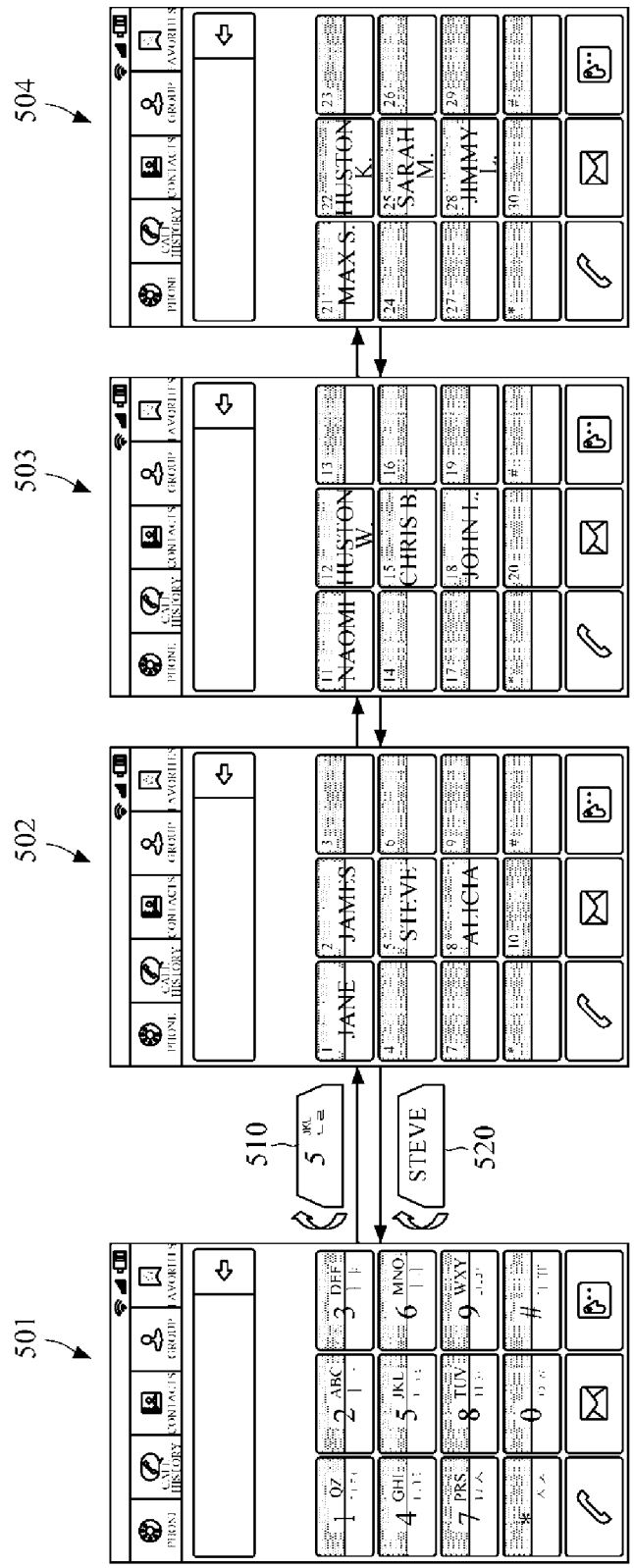

FIG. 5B illustrates performing an operation of a mobile terminal using a display switching operation of a 3D keypad according to an exemplary embodiment of the present invention.

Referring to FIG. 5B, by flipping or rotating a mobile terminal in a first direction, a first display screen 501 may be switched to a second display screen 502 to display first 10 speed-dial contacts (e.g., contacts 1 to 10) and by additionally flipping or rotating in the first direction, the second display screen 502 may be switched to a third display screen 503 to display second 10 speed-dial contacts (e.g., contacts 11 to 20). In the same manner, by flipping or rotating the mobile terminal again in the first direction, the third display screen 503 may be switched to a fourth display screen 504 to display third 10 speed-dial contacts (e.g., contacts 21 to 30). In the second screen 502, identification information of first 10 speed-dial contacts (e.g., contacts 1 to 10) may be displayed, which may correspond to the keypad numbers 1, 2, 3, 4, 5, 6, 7, 8, 9, and 0 displayed in the first display screen 501. In the third display screen 503, identification information of second 10 speed-dial contacts (e.g. contacts 11 to 20) may be displayed on the corresponding keypad numbers. For example, the contact name of "NAOMI" may be displayed where keypad number 1 is displayed in the first display screen 501. Further, in the fourth display screen 504, identification information of third 10 speed-dial contacts (e.g., contacts 21 to 30) may be displayed the corresponding keypad numbers. For example, the contact name of "MAX S." may be displayed in the fourth display screen 504 where keypad number 1 is displayed in the first display screen 501. In this manner, details of a plurality of speed-dial numbers can be sequentially displayed.

Further, by flipping the mobile terminal in a second direction that is different or opposite to the first direction, the screen may be switched from the fourth display screen 504 to the third display screen 503, from the third display screen 503 to the second display screen 502, and from the second display screen 502 to the first display screen 501. In another example, regardless of the current display screen, the screen may be switched directly to the first display screen 501 showing the number keypad in response to the flipping motion occurring in the second direction.

Here, for example, the first direction may be set to a forward direction of the mobile terminal, and the second direction may be set to a backward direction. However, the first direction and the second direction are not limited thereto, and the first direction and the second directions may be directions, which are different or opposite to each other.

Further, the example shown in FIG. 5B may be implemented by the method used in the example shown in FIG. 4. More specifically, the mobile terminal may be configured to switch the currently displayed screen sequentially to another display screen when the mobile terminal is titled more than a reference threshold angle in the first direction. When the currently displayed display screen is completely switched from the first display screen 501 to the second display screen 502 by tilting the mobile terminal more than the reference angle in the first direction, the user may bring back the mobile terminal to its previous position or orientation and then tilt again the mobile terminal more than the reference angle in the first direction so that the second display screen 502 may be switched to the third display screen 503. However, aspects of the invention are not limited thereto, such that the mobile terminal may be tilted again without returning to its previous orientation or position to switch the second display screen 502 to the third display screen 503. In addition, when the currently displayed display screen is completely switched from the first display screen 501 to the second display screen 502 by tilting the mobile phone more than the reference angle in the first direction, if the user keeps or maintains the mobile phone tilted at the current angle, the currently displayed second display screen 502 may be switched sequentially to the third display screen 503, and to the fourth display screen 504. The reference threshold angle may be set manually by the user or automatically provided by the mobile terminal.

Further, a reverse or backward screen switching operation may be performed by titling the mobile phone in the second direction that may be different or opposite to the first direction. More specifically, when the fourth screen display 501 is currently displayed and if the mobile phone is titled more than the reference angle in the second direction, the currently displayed screen may be sequentially switched to the third display screen 503, the second display screen 502, and the first display screen 501. In addition, the mobile terminal may be configured to switch directly to the first display screen when the mobile terminal is titled more than the reference angle in the second direction, regardless of a currently displayed screen.

As described above with reference to FIG. 5A and FIG. 5B, a graphic effect that may appear during screen switch may be implemented in various ways. For example, the screen may be switched while the 3D keys are rotating as shown in FIG. 4, or while the 3D keys are folded over as shown in FIG. 5A and FIG. 5B. In addition, the first surface of one or more 3D key may be faded out to display the second surfaces, or the first surfaces may be instantly switched to the second surfaces.

Figure 6:
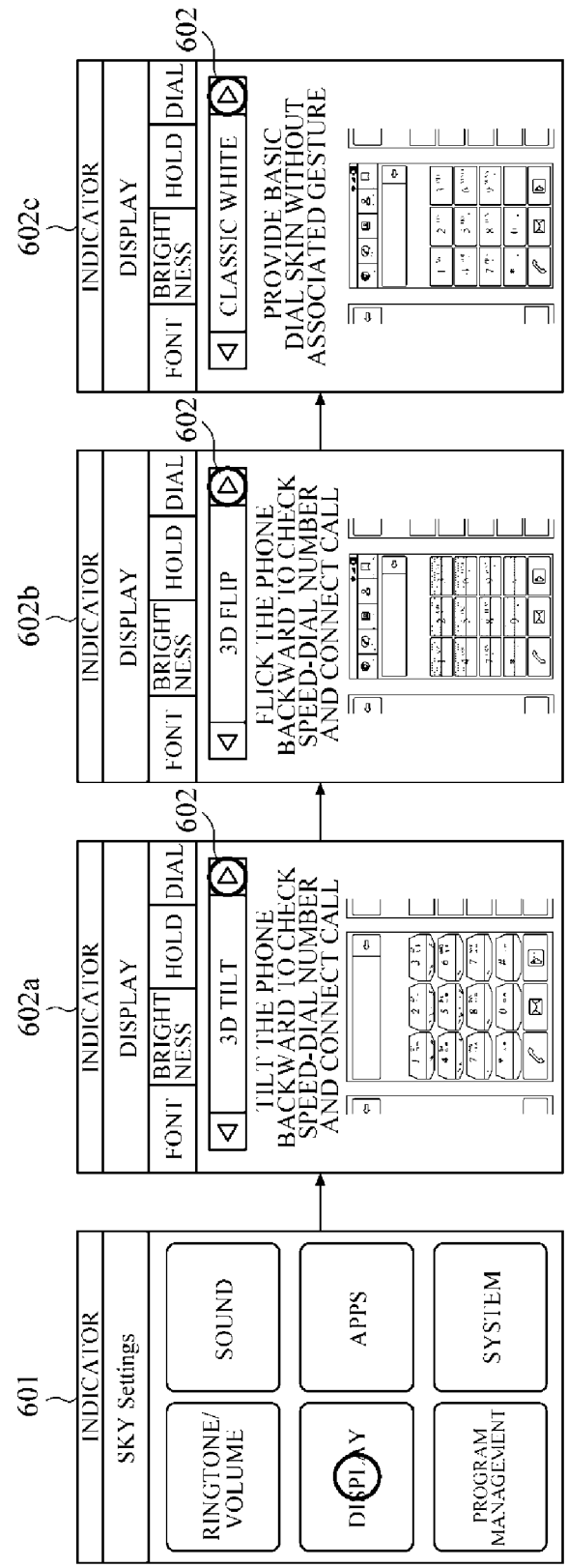
FIG. 6 illustrates a configuration setting operation for setting a display switching operation according to an exemplary embodiment of the present invention.

FIG. 6 illustrates a configuration setting operation for setting a display switching operation according to an exemplary embodiment of the present invention.

Referring to FIG. 6, a user may select a menu item labeled "DISPLAY" from a main setting page 601 to display at least one of a first display setting page 602a, a second display setting page 602b, and a third display setting page 602c. In response to user's selection of "DIAL" button from the one of the first display setting page 602a, the second display setting page 602b, or the third display setting page 602c, a toggle button 602 is shown. By touching or pressing on the toggle button 602, the user can select one of three dial modes or a mode providing how to manipulate mobile terminal to switch a first surface to a second surface.

Examples of the dial mode may include a "3D TILT" mode, a "3D FLIP" mode, and a "CLASSIC WHITE" mode. In the "3D TILT" mode, the user may tilt the mobile terminal backwards to identify speed-dial numbers, which may be used to connect a call. In the "3D FLIP" mode, the user may flick the mobile terminal backwards to identify speed-dial numbers, which may be used to connect a call. In the "CLASSIC WHITE" mode, the mobile terminal provides a basic dial skin without associating any gestures with terminal dial buttons. However, aspects of the invention are not limited thereto, such that a variety of modes can be used.

Figure 7:
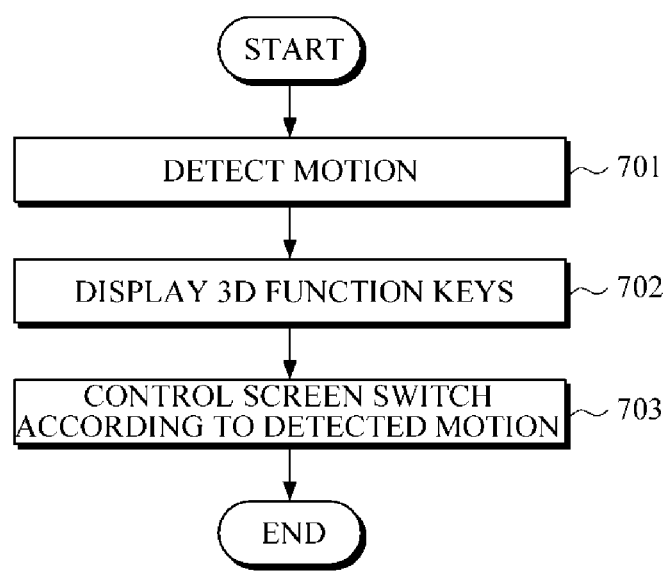
FIG. 7 illustrates a method for a display switching operation according to an exemplary embodiment of the present invention.

FIG. 7 illustrates a method for a display switching operation according to an exemplary embodiment of the present invention. The method of FIG. 7 below will be described as if performed by the mobile terminal of FIG. 1, but is not limited thereto.

A user's motion is detected in operation 701. For example, the motion detecting unit 101 may detect a tilting motion in which the mobile terminal is tilted, or a flipping motion in which the user flicks the mobile terminal in a flicking or flipping direction, such as in a backward direction. When the motion detecting unit 101 detects a tilting motion, at least one of a titling direction and a tilting angle may be detected. When the motion detecting unit 101 detects the flipping or rotating motion, the flipping or rotating direction may be detected.

In operation 702, the 3D keys are displayed. For example, the display unit 102 may display the 3D keys having at least two surfaces, a first surface being mapped to a number button on a numerical keypad, which may be used for performing a dialing operation and a second surface being mapped to speed-dial number information corresponding to the number button. However, aspects of the invention are not limited thereto, such that the first surface and the second surface may provide a keyboard with English letters, a keyboard including a combination of numbers and symbols, and the like.

In operation 703, switching a display of the two surfaces of the 3D key is controlled according to the detected motion. For example, the control unit 103 may switch a currently displayed first surface to the second surface or vice versa by rotating the 3D keys in response to the detected tilting or flipping motion of the mobile terminal.

According to aspects of the invention, the order of and the graphic effect that may be provided during a display switching operation of the 3D key may be determined according to previously stored setting information. Further, the graphic effect provided during the display switching operation may be based on information displayed on one or more surfaces of the 3D keys or the detected motion of the mobile terminal. For example, the control unit 103 may control the display switching operation with respect to the setting information stored in the storage unit 104. More specifically, information corresponding to a surface to be displayed and the switching method may be extracted from the storage unit 104. Further, based on the extracted information and switching method, the displayed surface of one or more 3D keys can be changed.

Figure 8B:
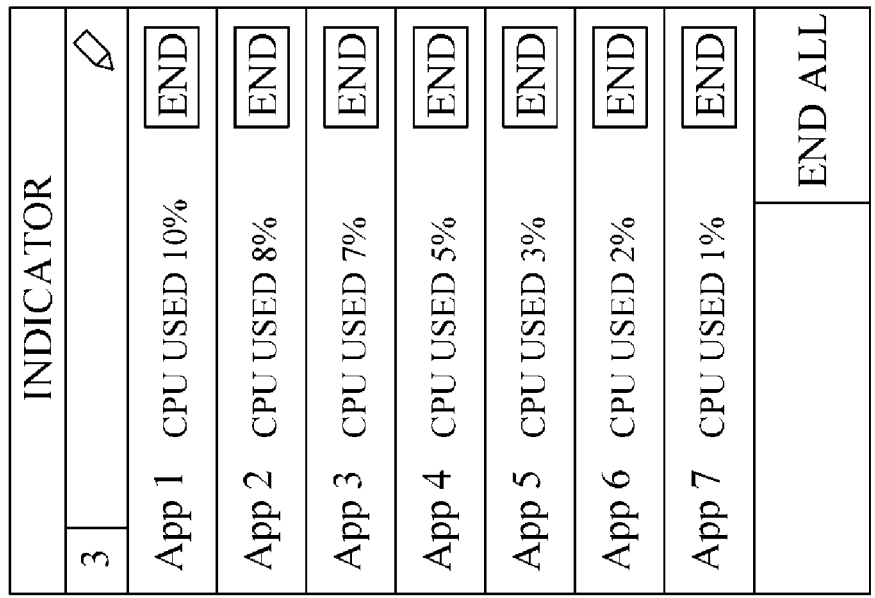
Figure 8B:
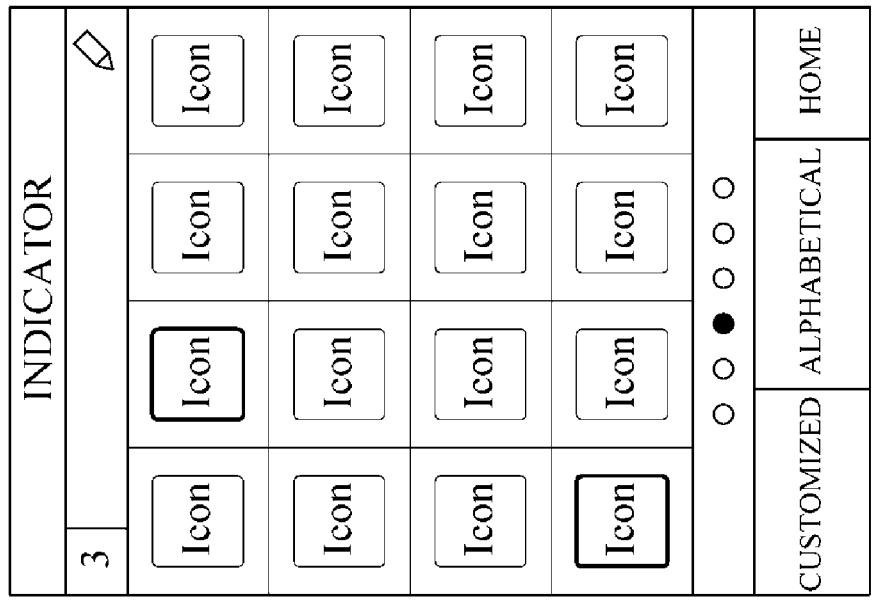
Figure 8C:
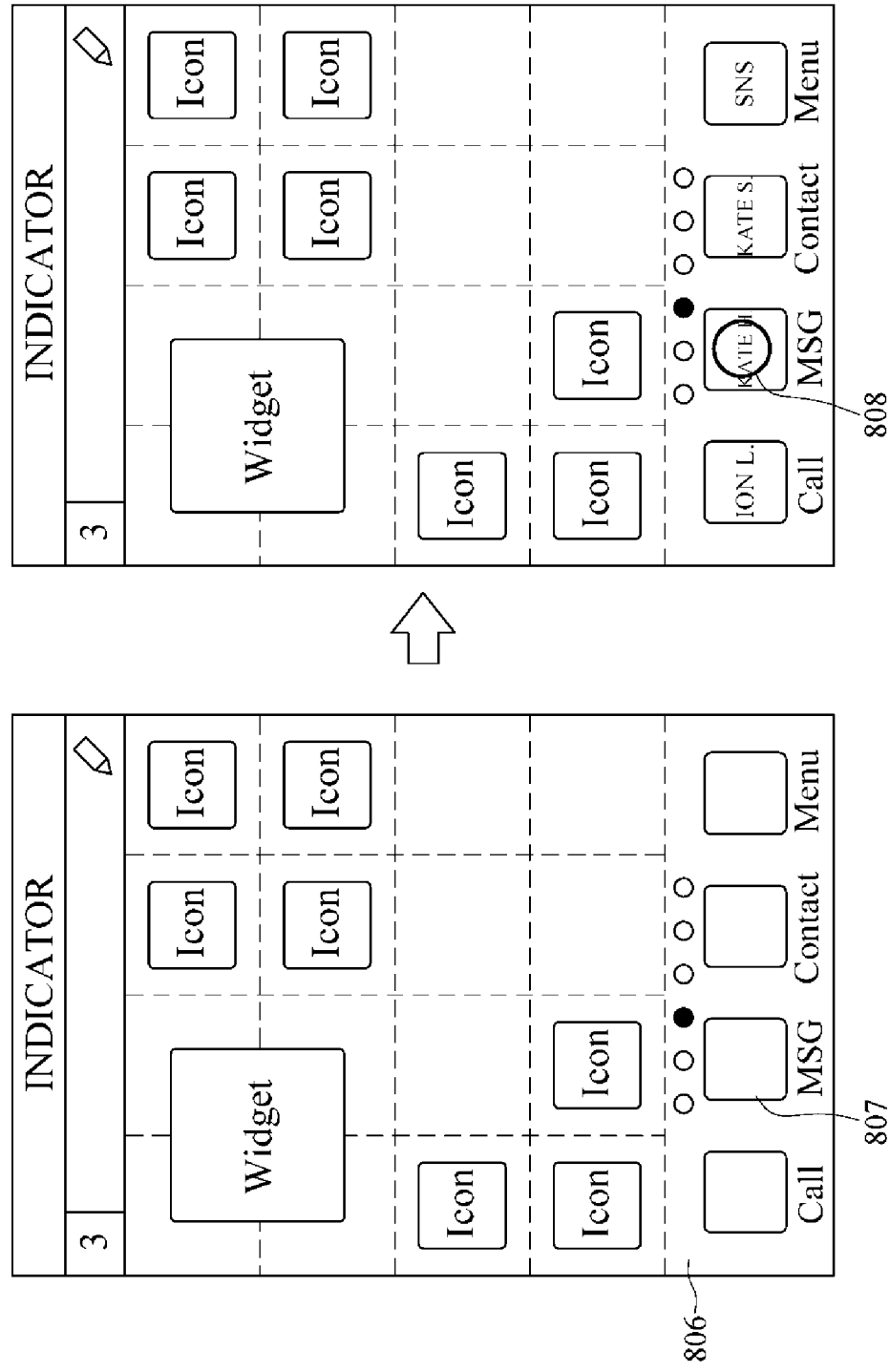

FIG. 8A, FIG. 8B, and FIG. 8C illustrate performing an operation of a mobile terminal using display switching operation of a 3D keypad according to exemplary embodiments of the present invention.

Referring to FIG. 8A, in addition to the 3D keys, additional operation keys, such as dial keys and special keys, widget icons, which may be displayed on a home screen, may be displayed in 3D. A displayed surface of the icon may be switched in 3D to an associated operation page in response to a detected motion of the mobile terminal. For example, as shown in FIG. 8A, in response to a detected tilting or flipping motion of the mobile terminal, a clock icon 801 may turn with respect to a reference rotation axis 802 and a rear surface 803 that is mapped to an alarm operation is displayed. When the user taps the displayed rear surface 803, an alarm setting operation may be activated.

However, aspects of the invention are not limited thereto, such that the clock icon 801 may be formed as a polyhedron having a front face mapped with a clock operation, a right side mapped with an alarm operation, a back side mapped with a stopwatch operation, and a top side mapped with a timer operation.

Referring to FIG. 8B, a GUI of the menu screen displaying a plurality of icons may be switched to a related menu, such as a task manager. Further, the icons may be switched immediately to the related menu. For example, a basic menu screen or a wallpaper screen 804 displaying a plurality of application execution icons may be switched to a task manager screen 805 showing CPU usage in response to the detected motion of the mobile terminal, such as detected titling or flipping motion. Examples of the related menu may include various display types of menu screens.

Referring to FIG. 8C, shortcut buttons displayed in a launcher area 806, which may be located towards a bottom portion of a display screen of the mobile terminal may be switched to buttons that may be used to execute associated operations according to the detected motion of the mobile terminal. Here, a "Call" shortcut button, a "MSG" shortcut button, a "Contact" shortcut button, and a "Menu" shortcut button are provided in the launcher area 806. However, aspects of the invention are not limited thereto, such that other shortcut buttons may be added or registered in the launcher area 806 and the current shortcut buttons may be edited, deleted or replaced without another shortcut button. For example, on a text message icon 807, names of persons to whom the user has recently sent the most messages to may be toggled in response to a detection of a reference gesture or motion (e.g., shaking the mobile terminal) of the mobile terminal. The name of such person may be displayed on a back side 808 of the text message icon 807, which may become visible according to the detected motion of the mobile terminal.

Although not illustrated in more detail, the examples described above may be applied to a camera equipped in the mobile terminal, so that a front camera may be switched to a rear camera, or vice versa, in response to the detected motion of the mobile terminal.

In addition, when the user receives a text message or a social network service (SNS) push message while viewing content played by a digital multimedia broadcasting (DMB) or a video player, the current screen may be switched to the display screen displaying the text message or the SNS push message in response to a detected flipping or tilting motion of the mobile terminal in a certain direction, or a part of the message may appear on the screen corresponding to the tilting angle of the mobile terminal. In addition, by detecting a tilting motion or a flipping motion of the mobile terminal, the user can switch the currently displayed screen to the text message screen or the SNS application execution screen.

In another example, in response to the flipping or tilting motion being detected, a foreground application may be switched to a background application, or vice versa, or a part of the current display screen may be switched to a different display screen.

As described above, display switch of the 3D key can be performed according to a detected motion of the mobile terminal, which may allow the user to intuitively recognize various operations that may be mapped to one or more 3D keys.

According to exemplary embodiments of the present invention, information input using a GUI button can be recognized, and mode switch can be performed through the detected motion of the mobile terminal. In addition, the user may identify auxiliary information on the GUI button with less confusion, reduce manipulation time spent to perform an operation, and switch to an operation associated with the GUI button.

According to exemplary embodiments of the present invention, if a multifaceted key, such as a 3D key has each side mapped with different information, which may display the mapped information or character. Further, if the 3D key is rotated according to a recognized motion and/or manipulation of the mobile terminal, a currently displayed side or surface of the 3D key may be switched to a different side or surface, such that one or more sides of the 3D key can display simpler information. Accordingly, the use of 3D key may reduce inconvenience of performing additional steps and provide more information during the operation of the mobile terminal.

The methods and/or operations described above may be recorded, stored, or fixed in one or more computer-readable storage media that includes program instructions to be implemented by a non-transitory computer to cause a processor to execute or perform the program instructions. The media may also include, alone or in combination with the program instructions, data files, data structures, and the like. Examples of a non-transitory computer-readable media include magnetic media, such as hard disks, floppy disks, and magnetic tape; optical media, such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for switching display surfaces of multifaceted graphical objects, comprising:
    assigning a first surface of each of the multifaceted graphical objects to a first object;
    assigning a second surface of each of the multifaceted graphical objects to a second object associated with the first object, wherein each second surface is adjacent to, and shares an edge with, a corresponding first surface;
    displaying the first surface of each of the multifaceted objects on a mobile terminal;
    detecting a motion of the mobile terminal; and
    switching the displayed first surface to the second surface of the multifaceted graphical objects, wherein the switching motion from the displayed first surface to the second surface matches with the detected motion, the detected motion being at least one of a tilting motion, flipping motion, and a rotating motion,
    wherein the first surface displays a numerical graphical object of a numerical keypad and the second surface displays corresponding identification information of a speed-dial contact.

2. The method of claim 1, wherein a portion of the first surface and a portion of the second surface are displayed simultaneously in response to the detected motion.

3. The method of claim 1, wherein the switching the displayed first surface to the second surface comprises rotating the multifaceted graphical object.

4. The method of claim 1, wherein the switching the displayed first surface to the second surface comprises folding a portion of the multifaceted graphical object to simultaneously display a portion of the first surface and a portion of the second surface.

5. The method of claim 1, further comprising:
    selecting a display switching mode,
    wherein the displayed first surface is switched to the second surface according to the selected display switching mode.

6. The method of claim 1, wherein if the detected motion tilts the mobile terminal to have an angle beyond a reference threshold, the displayed first surface is switched directly to a third surface of the multifaceted graphical object.

7. The method of claim 1, wherein the multifaceted graphical object includes a multifaceted key.

8. The method of claim 1, wherein at least one of the surfaces of the multifaceted graphical object corresponds to at least one speed dial number.

9. The method of claim 1, further comprising:
    storing information corresponding to the first surface in a storage unit.

10. The method of claim 1, further comprising:
    switching to an edit screen for editing information corresponding to a selected surface of the multifaceted graphical object if the selected surface detects a first input type.

11. The method of claim 1, further comprising:
    executing an operation corresponding to a selected surface if the selected surface detects a second input type.

12. The method of claim 1, further comprising:
    inputting information corresponding to a selected surface if the selected surface detects a first input type.

13. The method of claim 1, further comprising:
    extracting information corresponding to a selected surface if the selected surface detects a second input type.

14. The method of claim 1, wherein the first surface is switched to the second surface when the detected motion corresponds to a first direction.

15. The method of claim 1, wherein the second surface is switched to the first surface when another motion of the mobile terminal corresponding to a second direction is detected.

16. A mobile terminal, comprising:
    a display unit to display a first surface of each of a plurality of multifaceted graphical objects;

a motion detecting unit to detect a motion of the mobile terminal; and a display control unit to switch the displayed first surface to a second surface of each of the multifaceted graphical objects, wherein each second surface is adjacent to, and shares an edge with, a corresponding first surface, and the switching motion from the displayed first surface to the second surface matches with the detected motion, the detected motion being at least one of a tilting motion, flipping motion, and a rotating motion, and wherein the first surface of each of the multifaceted graphical objects is assigned to a first object, and the second surface of each of the multifaceted graphical objects is assigned to a second object associated with the first object, wherein the first surface displays a numerical graphical object of a numerical keypad and the second surface displays corresponding identification information of a speed-dial contact.

17. The mobile terminal of claim 16, wherein the display control unit switches the displayed first surface to the second surface based on at least one of a direction, speed, intensity, and angle of the detected motion.

18. The mobile terminal of claim 16, wherein the display control unit switches the displayed first surface to the second surface by rotating the multifaceted graphical object such that a portion of the first surface and a portion of the second surface are displayed simultaneously during the rotation.

19. The mobile terminal of claim 16, wherein the display control unit switches the displayed first surface to the second surface by folding a portion of the multifaceted graphical object such that a portion of the first surface and a portion of the second surface are displayed simultaneously.

20. The mobile terminal of claim 16, wherein the multifaceted graphical object is a multifaceted key.

21. A method for switching display surfaces of multifaceted graphical objects, comprising:

assigning a first surface of each of the multifaceted graphical objects to a numerical graphical object of a numerical keypad;

assigning a second surface of each of the multifaceted graphical objects to corresponding identification information of a speed-dial contact, wherein each second surface is adjacent to, and shares an edge with, a corresponding first surface;

displaying the first surface of each of the multifaceted graphical objects on a mobile terminal as the numerical keypad;

detecting a tilting motion of the mobile terminal relative to a current position; and displaying second surfaces of the multifaceted graphical objects by rotating the multifaceted graphical objects by an angle corresponding to the detected tilting motion.

22. The method of claim 21, wherein displaying the second surfaces comprises switching the displayed first surfaces to the second surfaces of the multifaceted graphical objects when a detected tilt angle is greater than a reference angle.

23. The method of claim 21, wherein displaying the second surfaces comprises simultaneously displaying the first surfaces and the second surfaces of the multifaceted graphical objects when a detected tilt angle is less than a reference angle.

* * * * *